United States Patent
Payne et al.

(10) Patent No.: US 11,453,296 B2
(45) Date of Patent: Sep. 27, 2022

(54) SYSTEMS AND METHODS FOR IMPROVING PROPULSION OF A VEHICLE USING SELECTIVELY ATTACHABLE HUB MOTORS

(71) Applicant: Toyota Motor Engineering & Manufacturing North America, Inc., Plano, TX (US)

(72) Inventors: Joshua D. Payne, Ann Arbor, MI (US); Nathan C. Westover, New Hudson, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 457 days.

(21) Appl. No.: 16/588,198

(22) Filed: Sep. 30, 2019

(65) Prior Publication Data
US 2021/0094425 A1  Apr. 1, 2021

(51) Int. Cl.
| | | |
|---|---|---|
| *B60L 15/42* | (2006.01) | |
| *B60L 7/10* | (2006.01) | |
| *B60L 50/60* | (2019.01) | |
| *B60K 7/00* | (2006.01) | |
| *B60K 17/356* | (2006.01) | |

(52) U.S. Cl.
CPC ............ *B60L 15/42* (2013.01); *B60K 7/0007* (2013.01); *B60L 7/10* (2013.01); *B60L 50/60* (2019.02); *B60K 17/356* (2013.01); *B60L 2220/44* (2013.01); *B60Y 2200/91* (2013.01)

(58) Field of Classification Search
CPC .. B60L 15/42; B60L 7/10; B60L 50/60; B60L 2200/44; B60K 7/0007; B60K 17/356; B60K 17/354; B60Y 2200/91
See application file for complete search history.

(56) References Cited

U.S. PATENT DOCUMENTS

| | | |
|---|---|---|
| 4,532,689 A | 8/1985 | Harder et al. |
| 7,825,616 B2 | 11/2010 | Clark et al. |
| 8,342,612 B2 | 1/2013 | Sgherri et al. |

(Continued)

FOREIGN PATENT DOCUMENTS

| | | |
|---|---|---|
| CN | 102897016 A | 1/2013 |
| CN | 107160995 A | 9/2017 |

(Continued)

*Primary Examiner* — James M McPherson
*Assistant Examiner* — Kyle J Kingsland
(74) *Attorney, Agent, or Firm* — Christopher G. Darrow; Darrow Mustafa PC

(57) ABSTRACT

Systems, methods, and other embodiments described herein relate to improving propulsion of a vehicle. In one embodiment, a method includes, in response to detecting a change in a wheel configuration associated with modifying an arrangement of hub motors that are selectively attachable on wheels of the vehicle, identifying attributes of the hub motors coupled with the wheels of the vehicle. The hub motors are structured to be attached to the wheels of the vehicle without removing the wheels from the vehicle. The method includes determining properties of the hub motors according to the attributes and the wheel configuration. Further, the method includes managing electrical power delivery to the hub motors to propel the vehicle according to the properties.

20 Claims, 9 Drawing Sheets

(56) References Cited

U.S. PATENT DOCUMENTS

| | | | |
|---|---|---|---|
| 8,720,615 B2 * | 5/2014 | Wanger | B62D 59/04 |
| | | | 180/335 |
| 8,746,396 B2 | 6/2014 | Vallejo et al. | |
| 8,752,660 B2 | 6/2014 | Ajisaka | |
| 8,925,659 B2 | 1/2015 | Peters | |
| 8,955,793 B2 | 2/2015 | Sullivan | |
| 9,216,612 B2 | 12/2015 | Zdrahal et al. | |
| 9,248,733 B2 | 2/2016 | Mair et al. | |
| 9,428,265 B2 | 8/2016 | Cox | |
| 9,475,342 B2 | 10/2016 | Feng | |
| 9,616,706 B2 | 4/2017 | Benoit, Jr. | |
| 9,688,099 B2 * | 6/2017 | Niemczyk | B60B 11/02 |
| 2004/0021437 A1 | 2/2004 | Maslov et al. | |
| 2007/0251742 A1 | 11/2007 | Adams, III et al. | |
| 2007/0257570 A1 * | 11/2007 | Walter | B60K 7/0007 |
| | | | 310/67 R |
| 2008/0023237 A1 | 1/2008 | Houle | |
| 2011/0124465 A1 | 5/2011 | Chen | |
| 2014/0125205 A1 * | 5/2014 | Landfors | H02K 7/006 |
| | | | 310/67 R |
| 2015/0027795 A1 * | 1/2015 | Hirai | B60L 58/20 |
| | | | 180/60 |
| 2017/0225684 A1 | 8/2017 | Alshamrani | |
| 2019/0134474 A1 | 5/2019 | Schneiter | |
| 2021/0061005 A1 | 3/2021 | Galang et al. | |
| 2021/0061095 A1 | 3/2021 | Galang et al. | |
| 2021/0094406 A1 | 3/2021 | Galang et al. | |
| 2021/0094407 A1 | 4/2021 | Payne et al. | |

FOREIGN PATENT DOCUMENTS

| | | |
|---|---|---|
| DE | 2803739 A1 | 8/1978 |
| EP | 2340953 A1 | 7/2011 |
| GB | 190928475 A | 6/1910 |
| JP | 2017043213 A | 3/2017 |
| SU | 1661004 A1 | 7/1991 |

\* cited by examiner

SYSTEMS AND METHODS FOR IMPROVING PROPULSION OF A VEHICLE USING SELECTIVELY ATTACHABLE HUB MOTORS

TECHNICAL FIELD

The subject matter described herein relates, in general, to systems and methods for improving propulsion of a vehicle, and, more particularly, to manage power delivery to hub motors that may be attached or detached without removal of a wheel from the vehicle.

BACKGROUND

Electric vehicle manufacturers are shifting propulsion mechanisms from a centralized electric motor and drivetrain technology to electric motors directly integrated onto the wheels, i.e., hub motors. Some of the advantages of directly driving the wheels with electric motors include improved torque response and enhanced handling due to independent wheel control, faster acceleration, and the elimination of mechanical gearing, e.g., transmission, differential, etc. In present configurations, hub motor designs integrate the hub motors with the wheels and do not provide for removal without first removing the entire wheel. The resulting hub motor/wheel assembly is expensive and heavy. Thus, manipulating the hub motor arrangement is not generally feasible as such operations would require extensive knowledge of a hub motor system and support from a dedicated service facility and trained service technicians.

SUMMARY

Example systems and methods are disclosed herein that relate to a manner of improving propulsion of a vehicle. In a first aspect, the disclosed hub motors incorporate a modular functionality such that they are removable and replaceable without disturbing the connection of the wheel to the vehicle. Accordingly, the location of the hub motor is toward the outside of the wheel, thus facilitating access to components of the hub motor and permitting a vehicle user to attach or detach the hub motor while leaving the wheel and associated tire mounted to the vehicle. In a second aspect, the noted systems and methods recognize when a hub motor configuration changes on the vehicle, identifies the resulting hub motor configuration, and automatically manages electrical power delivery to the hub motor configuration according to locations of the hub motors and characteristics obtained from the hub motors. In this way, the vehicle user can reconfigure the propulsion strategy of the vehicle by personally attaching/detaching and/or adding/subtracting hub motors to wheels of the vehicle without removing the wheel. Furthermore, the disclosed systems and methods remove the burden of manually re-calibrating the new hub motor configuration and automatically manages the electrical power delivery to the hub motors.

In one embodiment, a power delivery system for improving propulsion of a vehicle is disclosed. The power delivery system includes one or more processors and a memory that is communicably coupled to the one or more processors. The memory stores a detection module including instructions that when executed by the one or more processors cause the one or more processors to identify attributes of the hub motors coupled with the wheels of the vehicle. The detection module identifies the attributes of the hub motors in response to detecting a change in a wheel configuration associated with modifying an arrangement of hub motors that are selectively attachable on wheels of the vehicle. The hub motors are structured to be attached to the wheels of the vehicle without removing the wheels from the vehicle. The memory stores a managing module including instructions that when executed by the one or more processors cause the one or more processors to determine properties of the hub motors according to the attributes and the wheel configuration, and manage electrical power delivery to the hub motors to propel the vehicle according to the properties.

In one embodiment, a non-transitory computer-readable medium for improving propulsion of a vehicle. The non-transitory computer-readable medium stores instructions that when executed by one or more processors cause the one or more processors to perform the disclosed functions. The instructions include instructions to, in response to detecting a change in a wheel configuration associated with modifying an arrangement of hub motors that are selectively attachable on wheels of the vehicle, identify attributes of the hub motors coupled with the wheels of the vehicle. The hub motors are structured to be attached to the wheels of the vehicle without removing the wheels from the vehicle. The instructions include instructions to determine properties of the hub motors according to the attributes and the wheel configuration. Furthermore, the instructions include instructions to manage electrical power delivery to the hub motors to propel the vehicle according to the properties.

In one embodiment, a method of improving propulsion of a vehicle is disclosed. The method includes, in response to detecting a change in a wheel configuration associated with modifying an arrangement of hub motors that are selectively attachable on wheels of the vehicle, identifying attributes of the hub motors coupled with the wheels of the vehicle. The hub motors are structured to be attached to the wheels of the vehicle without removing the wheels from the vehicle. The method includes determining properties of the hub motors according to the attributes and the wheel configuration. Further, the method includes managing electrical power delivery to the hub motors to propel the vehicle according to the properties.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
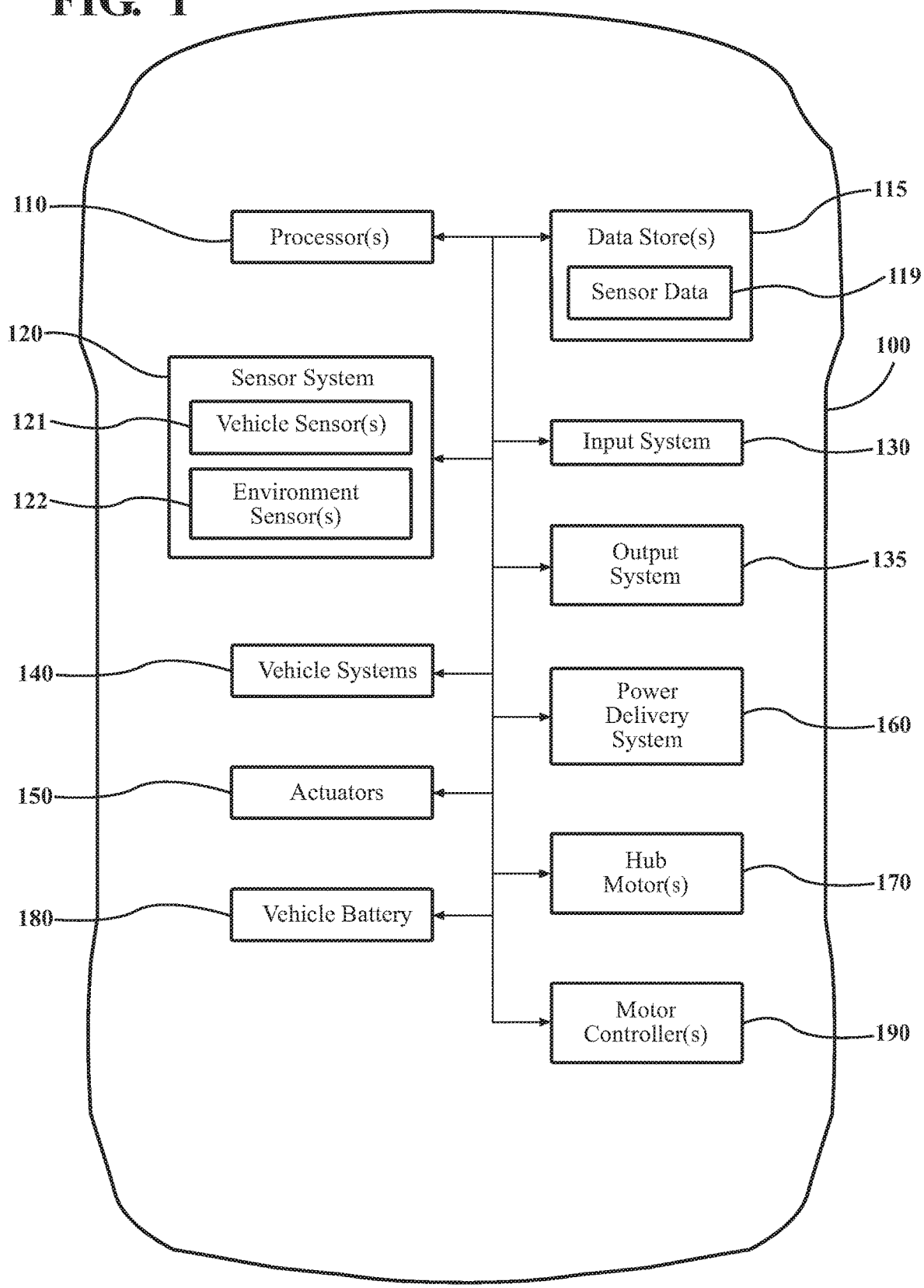
FIG. 1 illustrates one embodiment of a vehicle within which systems and methods disclosed herein may be implemented.

Systems, methods, and other embodiments associated with improving propulsion of a vehicle are disclosed. As alluded to previously, improving propulsion, as described herein, involves a vehicle platform that is user-configurable to meet the intended purposes of the vehicle user while at the same time removing the burden of involving a dedicated service facility. To enable such a feature, a power delivery system, in one embodiment, includes hub motors structured to be attached to wheels of the vehicle without removing the wheels from the vehicle as is generally required in existing hub motor configurations. Additionally, the power delivery system automatically manages electrical power delivery to the hub motors when an arrangement of the hub motors on the vehicle is modified. For example, the vehicle user can change a vehicle configured for RWD to an AWD configuration (e.g., for towing a heavy load) by adding two hub motors to the wheels mounted on front axles of the vehicle. In this case, the power delivery system detects a change in the wheel configuration associated with modifying the arrangement of the hub motors that are attached (e.g., by the vehicle user) and manages the electrical power delivery to all four hub motors.

The structure of the hub motor has a novel configuration of components that provide for securing the hub motor to an outward-facing surface of a vehicle wheel. The components include a rotor and a stator, and the outward placement of the rotor and the stator permit the vehicle user to attach/detach the hub motor to/from the wheel. For example, the vehicle user can attach/detach the rotor and the stator by engaging with accessible mechanical mechanisms that couple the components to the wheel without disturbing the wheel or tire mounting, as described below. The outer disposition and associated accessibility of the hub motor, as well as the mechanical coupling mechanisms, offer more versatility and convenience in the service, repair, replacement, and upgrade of the hub motors. Additionally, the outward placement of the components provides for a method of converting a wheel without a hub motor (i.e., a non-motive wheel) to a motorized wheel that includes a hub motor (i.e., a motive wheel). Using the RWD to AWD example from above, the vehicle user adds two rotors and two stators to the two non-motive wheels mounted to the front axles, which converts the non-wheels to the motive wheels for the AWD configuration.

Furthermore, the power delivery system, in one arrangement, identifies attributes of the hub motors coupled with the wheels of the vehicle. The power delivery system identifies the attributes in response to detecting the change in the wheel configuration. In one or more arrangements, the change in the wheel configuration is associated with modifying the arrangement of hub motors and includes attaching and/or detaching one or more hub motors to/from the wheels. The power delivery system, in one embodiment, determines properties of the hub motors according to the attributes and the wheel configuration, i.e., the location of the hub motors relative to the vehicle. For example, the power delivery system manages the electrical power delivery to the hub motors in the detected wheel configurations to propel the vehicle according to the properties of the hub motors.

Referring to FIG. 1, an example of a vehicle 100 is illustrated. As used herein, a "vehicle" is any form of electric vehicle transport. In one or more implementations, the vehicle 100 is an automobile. While arrangements will be described herein with respect to automobiles, it will be understood that embodiments are not limited to automobiles. In some implementations, the vehicle 100 may be any other form of electric vehicle transport (e.g., sport utility vehicles (SUV), trucks, recreation vehicles (RV's), all-terrain vehicles (ATV's), hybrid electric vehicles (HEV), buses, etc.) that, for example, benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a power delivery system 160 that is implemented to perform methods and other functions as disclosed herein relating to improving propulsion of the vehicle 100. Additionally, the vehicle 100 is illustrated as including one or more hub motors 170. In various implementations, the power delivery system 160 manages electrical power delivery to the hub motors 170 to propel the vehicle 100. Initially presented is a discussion of a novel configuration that provides for selective attachment/detachment of the hub motors 170 to/from wheels of the vehicle 100 while the wheel remains mounted to the vehicle 100. Attention will then turn back to the power delivery system 160, and the noted functions and methods will become more apparent with a further discussion of the associated figures.

Figure 2:
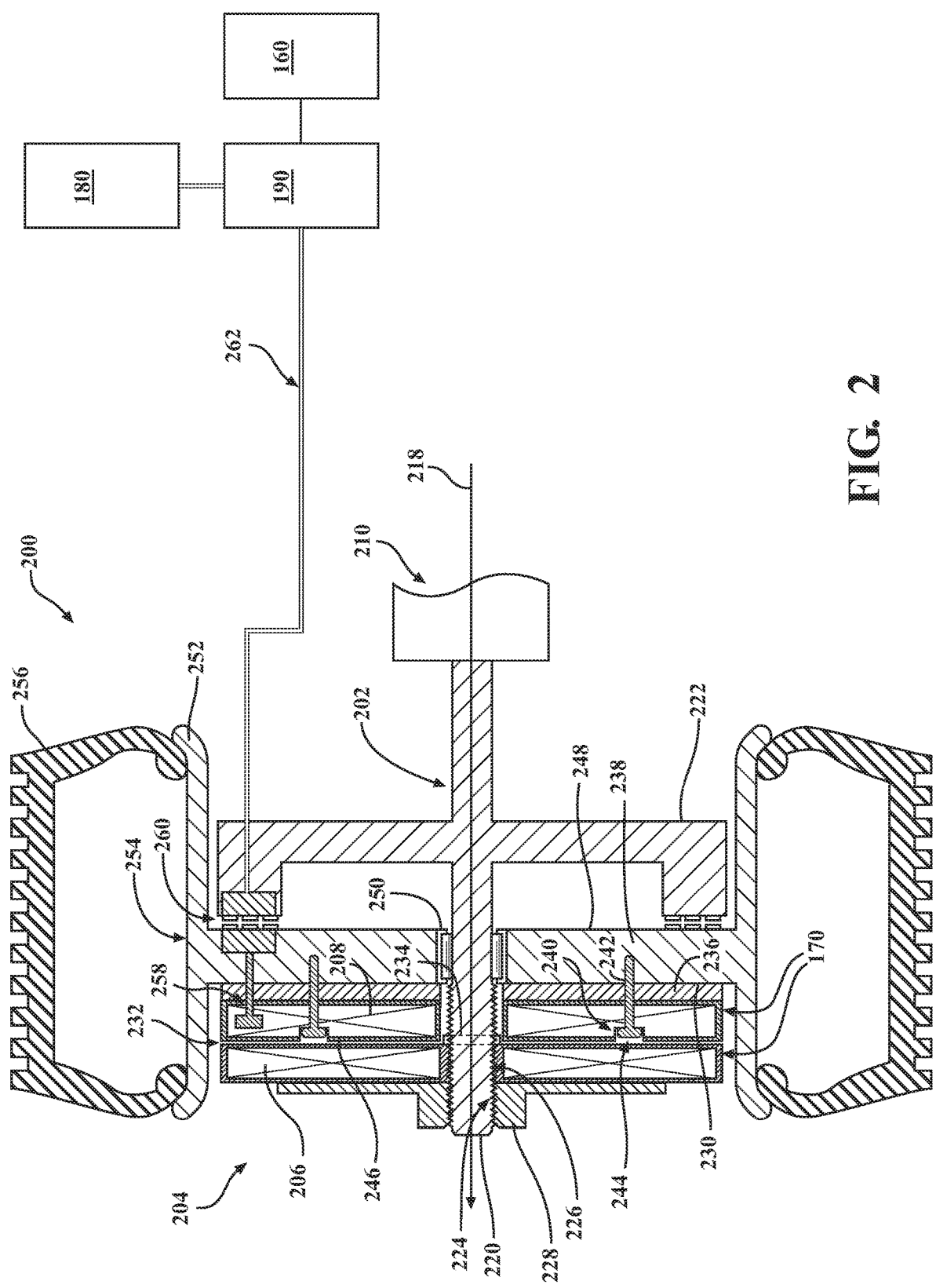
FIG. 2 illustrates a cross-sectional view of one embodiment of a wheel system for a vehicle.
Figure 3:
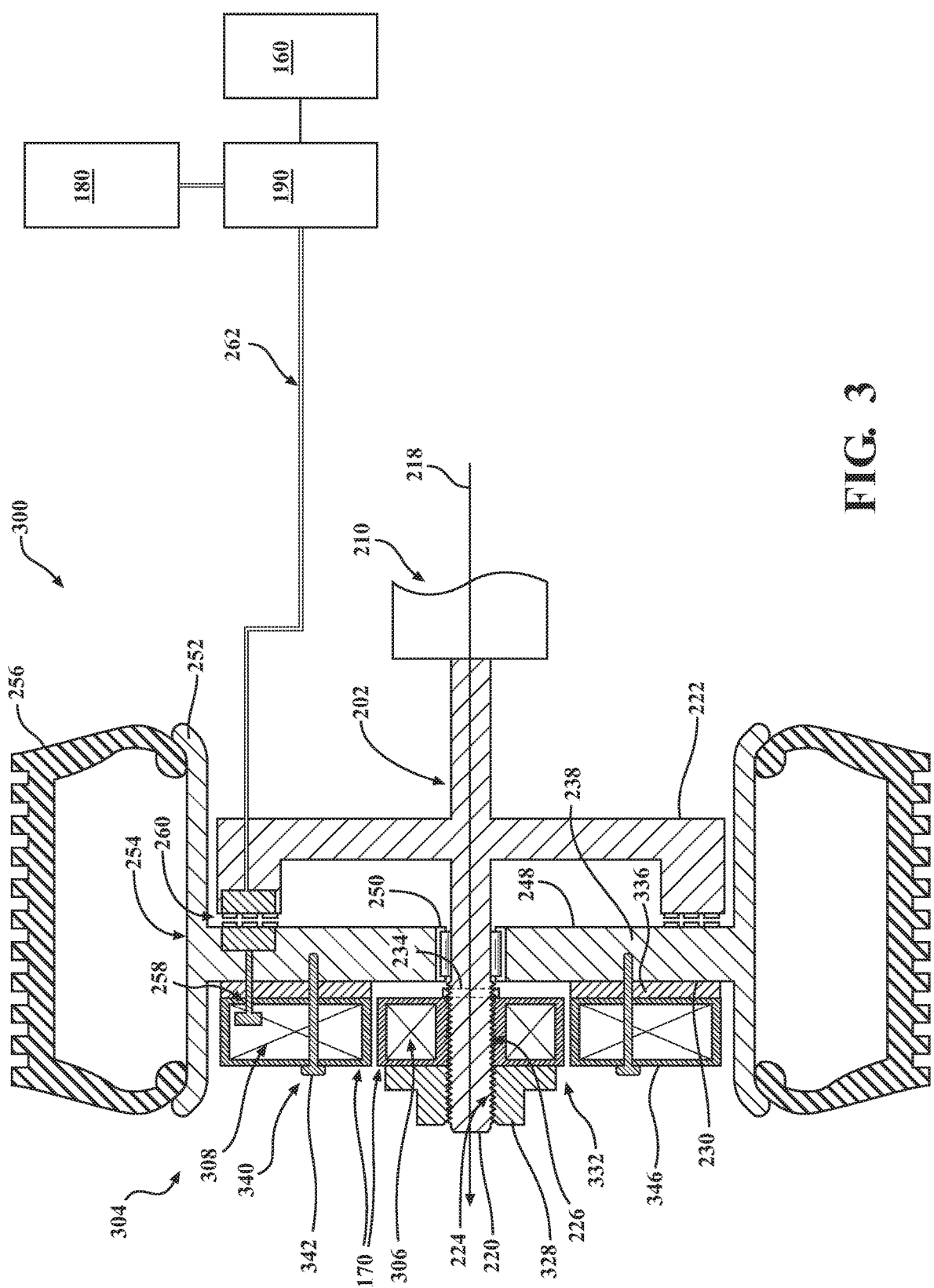
FIG. 3 illustrates a cross-sectional view of another embodiment of a wheel system for a vehicle.

FIG. 2 illustrates a cross-sectional view of a wheel system 200 that includes a non-rotatable axle 202, a wheel 204, and the hub motor 170. Because of the hub motor 170, the wheel system 200 is considered a motive wheel (i.e., a powered/driven wheel). The hub motor 170 includes a cylindrical rotor 206 and a cylindrical stator 208 with an axial arrangement. In other words, the alignment of the cylindrical rotor 206 and the cylindrical stator 208 is along the non-rotatable axle 202, as described in more detail below. FIG. 3 illustrates a cross-sectional view of a wheel system 300 that is similar to the wheel system 200 of FIG. 2 except for the arrangement of the rotor and the stator. The hub motor 170 of the wheel system 300 includes a cylindrical rotor 306 and a cylindrical stator 308 having a radial arrangement, i.e., the alignment of the cylindrical rotor 306 and the cylindrical stator 308 is radially outward away from the non-rotatable axle 202. As set forth below, the arrangement of the rotor and the stator may allow for different mechanical properties of the wheel system 200, 300, e.g., torque delivery, speed capability, etc. For reasons of efficiency, the wheel system 200 will be described in detail to illustrate how the hub motor 170 is attachable/detachable without removing the wheel 204, and differences with the wheel system 300 having a wheel 304 will be noted.

Accordingly, the wheel 204 of the wheel system 200 is rotatably disposed on the non-rotatable axle 202. The non-rotatable axle 202 is rigidly fixed to the vehicle 100 via a chassis member 210 and does not rotate relative to the wheel 204. For example, the chassis member 210 is a mechanical fastening mechanism that includes a vehicle suspension. The non-rotatable axle 202 comprises an axle that may be a front axle, a rear axle, or a supplemental axle, e.g., for multi-axle trucks, large recreation vehicles, etc. The non-rotatable axle 202 and one or more of the wheel systems 200 may comprise steerable wheels or non-steerable wheels.

The non-rotatable axle 202 extends away from the vehicle 100 in an axial direction 218 to an outer end 220 of the non-rotatable axle 202. The non-rotatable axle 202 includes a cylindrical axle hub 222 disposed inwardly from the outer end 220 (e.g., between the outer end 220 and the vehicle 100) that extends radially outward away from the non-rotatable axle 202. For example, the cylindrical axle hub 222 has a cylindrical shape, including various cylindrical disks, such as a hollowed cylindrical disk with an outwardly opening U-shape cross-section, as shown in FIG. 2.

The non-rotatable axle 202 is formed from, for example, various metals, such as various alloys of steel, aluminum, magnesium, and titanium, and composites, such as various polymer/fiber composites. The non-rotatable axle 202, includes, for example, a cylindrical axle having, e.g., a hollow center, a solid center, etc.

The non-rotatable axle 202 comprises an axle attachment 224 for attachment of a cylindrical rotor 206 of the hub motor 170 proximate to the outer end 220. The axle attachment 224 has engagement configurations, e.g., screw threads, splines, etc. In one embodiment, the axle attachment 224 comprises a plurality of axle screw threads formed into an outer surface of the non-rotatable axle 202, as shown in FIG. 2. The axle attachment 224 is configured to engage a plurality of mating attachments, e.g., screw threads, splines, etc. In one embodiment, the axle attachment 224 mates with a plurality of rotor screw threads formed into a rotor attachment 226 of the cylindrical rotor 206, as shown in FIG. 2. In one embodiment, the rotor attachment 226 of the cylindrical rotor 206 comprises a cylindrical surface and defines a cylindrical opening, and the rotor screw threads are disposed thereon.

In one embodiment, the cylindrical rotor 206 is attached to and positioned on the non-rotatable axle 202 by threading the rotor screw threads of the rotor attachment 226 onto the non-rotatable axle 202. The cylindrical rotor 206 may be detached and removed from the non-rotatable axle 202 by unthreading the rotor screw threads from the non-rotatable axle 202 and axle screw threads. Other suitable attachments 224, 226 are possible for securing the cylindrical rotor 206 to the non-rotatable axle 202, such as cotter pins, ring clips, lugs, splines, etc.

In one or more arrangements, the cylindrical rotor 206, 306, is secured onto the non-rotatable axle 202 by a cylindrical rotor cap 228, 328 having a cylindrical ring shape that comprises, for example, screw thread, splines, etc., as shown in FIGS. 2-3. In one embodiment, the cylindrical rotor cap 228, 328 includes cap screw threads on an inner diameter that are configured to engage the axle screw threads of the axle attachment 224.

In one arrangement, the position of the cylindrical rotor 206 along the non-rotating axle 202 may be at a predetermined rotor position ($P_R$) as measured along the length of the non-rotating axle 202 from the outer end 220 and/or away from an outer wheel surface 230 of the wheel 204. In one embodiment, the predetermined rotor position ($P_R$) provides a predetermined axial alignment with a cylindrical stator 208 of the hub motor 170. For example, the selection of the predetermined rotor position ($P_R$) establishes an air gap 232 that corresponds to a predetermined axial magnetic flux when the hub motor 170 is powered, as described herein. For the wheel system 300, an air gap 332 is determined by the radial geometries of the cylindrical rotor 306 and the cylindrical stator 308. The radial geometries, in one embodiment, are selected to provide the air gap 332 that corresponds to a predetermined radial magnetic flux when the hub motor 170 is powered. The predetermined rotor position ($P_R$) of the cylindrical rotor 306 of the wheel system 300 is selected to provide a predetermined axial alignment with the cylindrical stator 308 to, for example, maximize the flux transfer between the cylindrical rotor 306 and the cylindrical stator 308. In one embodiment, a rotor stop 234 disposed on the non-rotatable axle 202 establishes the predetermined rotor position ($P_R$). For example, the rotor stop 234 is a threaded bolt, threaded pin, a snap ring, or the like, to establish and fix $P_R$ as the cylindrical rotor 206, 306 is threaded onto the non-rotating axle 202.

As shown in FIGS. 2 and 3, the cylindrical stator 208, 308 is also fixed in a predetermined stator position ($P_S$) from the outer wheel surface 230 by a stator spacer 236, 336 disposed between the cylindrical stator 208, 308 and a wheel hub 238 of the wheel 204, 304, respectively. For example, the predetermined stator position ($P_S$) from the outer wheel surface 230 is defined by a thickness of the stator spacer 236, 336. The defined axial alignment of cylindrical rotor 206, 306 and cylindrical stator 208, 308 is a parameter that is configurable to provide a predetermined magnetic flux for the operation of the hub motor 170. In one embodiment, the stator spacer 236, 336 comprises a cylindrical ring having an inner diameter and outer diameter selected to conform to an inner diameter and outer diameter of the cylindrical stator 208, 308, respectively, as shown in FIGS. 2-3.

In one embodiment, the stator spacer 236, 336 is formed of metallic materials, such as alloys of steel, aluminum, magnesium, and titanium. Metals are advantageous materials for use as the stator spacer 236, 336 as well as the wheel 204, 304 because they have high thermal conductivity and can be configured as heat sinks to remove heat generated by the hub motor 170, particularly the cylindrical stator 208, 308 during operation.

The cylindrical stator 208, 308 in one arrangement, attaches to the stator spacer 236, 336 and the outer wheel surface 230 using two or more stator attachments 240, 340. Accordingly, the stator attachments 240, 340 receive threaded stator fasteners 242, 342, respectively. In the case of an axially arranged hub motor 170 of the wheel system 200, the stator attachments 240 include countersinks 244. In one embodiment, the stator attachments 240, 340 are aligned along the non-rotatable axle 202 in the axial direction 218 to receive the stator fasteners 242, 342 that couple the cylindrical stator 208, 308 to the stator spacer 236, 336 and the outer wheel surface 230. In one arrangement, the stator attachments 240, 340 circumferentially extend about an outer stator surface 246, 346 of the cylindrical stator 208, 308, respectively. The threaded stator fasteners 242, 342, in one embodiment, are threaded into a plurality of corresponding hub bores formed within the wheel hub 238. It should be noted that the threaded stator fasteners 242 may have different lengths than the threaded stator fastener 342 due to respective thicknesses of the cylindrical stator 208 and the cylindrical stator 308.

Referring to FIG. 2, the wheel 204 is disposed between the cylindrical axle hub 222 and the outer end 220. The wheel 204 includes the outer wheel surface 230, an inner wheel surface 248, and the wheel hub 238. The wheel hub 238 extends radially outward away from, and configured for reversible rotatable disposition on, the non-rotatable axle 202. The wheel hub 238 is supported by the non-rotatable axle 202 and is rotatable about a rotational axis that coincides with the axial direction 218. The wheel hub 238 is configured to be rotatably disposed on the non-rotatable axle 202. The rotatable disposition may be accomplished by, for example, various configurations of rotatable bushings or bearings. In one embodiment, the rotatable device comprises a wheel bearing 250.

The wheel 204 includes, in one arrangement, a wheel rim 252 that is attached to and circumferentially extending about the wheel hub 238. The wheel rim 252 includes an outer rim surface 254 configured to receive a tire 256. The cylindrical axle hub 222 is disposed proximate the inner wheel surface 248 and the wheel rim 252. The wheel 204 may have any suitable size, including any suitable wheel diameter or width of the wheel hub 238 or the wheel rim 252. The size of the wheel 204 may be selected, and the wheel 204 configured to accept a tire 256 of any size. The wheel 204 may be made of a suitable high strength material, including various metals, such as, for example, alloys of steel, aluminum, titanium, and magnesium.

The wheel system 200 includes the hub motor 170 that, in one embodiment, is selectively attachable and detachable to/from the wheel 204. The hub motor 170 is disposed between the wheel hub 238 (i.e., the outer wheel surface 230) and the outer end 220 in the axial direction 218. For the wheel system 200, the cylindrical rotor 206 and the cylindrical stator 208 are coaxially spaced along the non-rotatable axle 202, and the cylindrical stator 208 is disposed between the cylindrical rotor 206 and the wheel hub 238. For the wheel system 300, the cylindrical rotor 306 is concentrically disposed within the cylindrical stator 308, and the cylindrical rotor 306 and the cylindrical stator 308 extend radially outward from the non-rotatable axle 202. The cylindrical rotor 206, 306 includes the rotor attachment 226 to selectively couple the cylindrical rotor 206, 306 to the non-rotatable axle 202. The cylindrical stator 208, 308 includes the stator attachments 240, 340 to selectively couple the cylindrical stator 208, 308 to the outer wheel surface 230.

Furthermore, in one embodiment, the cylindrical rotor 206 and the cylindrical stator 208 are selectively attachable to the non-rotating axle 202 and the outer wheel surface 230, respectively, without removing the wheel 204 from the vehicle 100. Because the wheel hub 238 is rotatably disposed on the non-rotatable axle 202, the cylindrical stator 208 is rotatable about non-rotatable axle 202 due to being attached to the wheel hub 238

Other arrangements of the cylindrical rotor 206 and the cylindrical stator 208 are possible such that the hub motor 170 is attachable/detachable from an outward-facing surface of the wheel 204 without unmounting the wheel 204. For example, the hub motor 170 may include more than one rotor and/or more than one stator. The hub motor 170 may have a different arrangement of the cylindrical rotor 206 and the cylindrical stator 208, e.g., a transversal flux configuration. It should be appreciated that the other arrangements still allow the vehicle user to attach and detach the hub motor 170 without frustrating the concept of not involving a dedicated service facility, e.g., no special tools, reasonable time to attach/detach the hub motor 170 to/from the wheel 204, no special training, etc.

The hub motor 170, in one arrangement, is an electric machine having the configuration of the cylindrical rotor 206, 306 and the cylindrical stator 208, 308 described herein, including various alternating current (AC) and direct current (DC) powered electric motors. Additionally, the hub motor 170 may include brushed (BDC) motors and brushless (BLDC) motors. In one embodiment, the hub motor 170 is a three-phase high-voltage AC electric motor.

Referring back to FIG. 1, the vehicle 100 includes an energy storage device (ESD) utilized for vehicle propulsion. For example, the ESD may include batteries, fuel cells, etc., or any combination thereof. In one embodiment, the vehicle 100 includes a vehicle battery 180 that comprises battery electrodes and electrolytes, including those comprising lithium-ion and lithium-ion polymer batteries. For example, the vehicle battery 180 is configured to provide voltage and power levels suitable for vehicle propulsion.

The vehicle 100 includes, in one arrangement, one or more motor controllers 190. The motor controllers 190 include power electronics (e.g., power converters, power inverters, etc.) to condition the voltage and current needed by the AC electric motor. For example, a power inverter, as known in the art, transforms a DC voltage and current from the vehicle battery 180 to an appropriate AC voltage and current needed by the AC electric motor. In one arrangement, the power delivery system 160 configures the motor controllers 190 to output electrical power that corresponds to powering the hub motors 170 at various power levels, as set forth below. In one instance, the motor controllers 190 are standalone sub-components of the vehicle 100, as shown in FIG. 1. Alternatively, the motor controllers 190 may be integrated with the vehicle battery 180, disposed in the wheel system 200, 300, and more particularly, on the cylindrical stator 208, or located elsewhere in the vehicle 100. Further, the motor controllers 190 or sub-components of the motor controllers 190, for example, are integrated with the power delivery system 160.

The electric power for operation of the hub motors 170 is provided by the vehicle battery 180 via the motor controllers 190 through a series of electrical connection mechanisms to the cylindrical stator 208. For example, the series of electrical connection mechanisms include an electrical interface 258 of the hub motor 170, a rotary power interface 260 and an electrical power bus 262. In one embodiment, the electrical interface 258 is disposed within the cylindrical stator 208 and includes an exposed and accessible connector for coupling with the rotary power interface 260. Furthermore, the rotary power interface 260 couples with the electrical power bus 262. The series of electrical connection mechanisms allow the hub motor 170 to receive the electrical power from the vehicle battery 180 to power and control the hub motor 170.

The rotary power interface 260, for example, may include one or more electrical slip rings disposed on and between the wheel hub 238, i.e., the inner wheel surface 248, and the cylindrical axle hub 222. In one embodiment, the rotary power interface 260 electrically connects with the exposed connector of the electrical interface 258, which is rotatable, and the electrical power bus 262 is disposed in the cylindrical axle hub 222, which is not rotatable. It should be appreciated that the electrical power bus 262 can be disposed within the non-rotatable axle 202 as well. The exposed connector of the electrical interface 258 can be, for example, a pigtail including a direct connection to the cylindrical stator 208 and connectable to the rotary power interface 260 on the wheel hub 238. As another example, the exposed connector can directly interface to a wiring harness located in the wheel hub 238 that includes the rotary power interface 260.

In one or more arrangements, the electrical power bus 262 includes a low power wiring harness for controlling the hub motor 170. For example, the low power wiring harness may be wired alongside high power conductors of the electrical power bus 262 and connected from power delivery system 160 through the motor controller 190 and the series of electrical connection mechanisms to the cylindrical stator 208.

Figure 4:
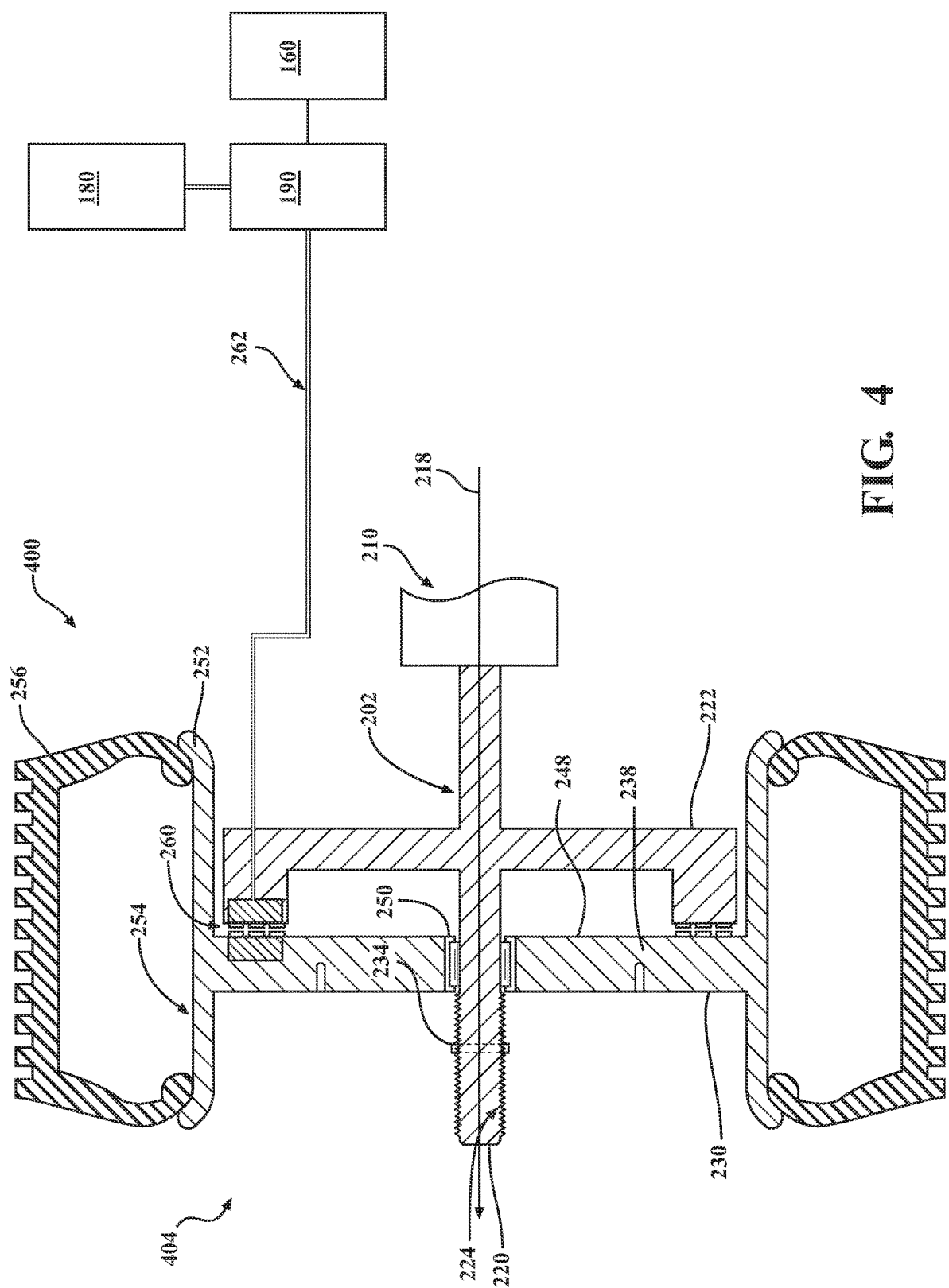
FIG. 4 illustrates a cross-sectional view of a wheel with a hub motor detached.

FIG. 4 illustrates a cross-sectional view of a wheel system 400 that includes the non-rotatable axle 202 and the wheel 404. The wheel system 400 is considered a non-motive wheel because the hub motor 170 is detached. Advantageously, in one embodiment, the wheel system 400 configured to comprise the same construction and same common components as the wheel systems 200 and/or 300. Accordingly, this arrangement enables swapping the hub motor 170 of the motive wheels onto the non-motive wheels without removing the wheel 204, 304, 404 of the vehicle 100. Furthermore, selectively attaching and detaching the cylindrical rotors 206, 306 and the cylindrical stators 208, 308 from the wheels 204, 304 enables the vehicle user to change vehicle drive types between, e.g., FWD, RWD, and AWD. Because of the same construction and common components, the hub motor configuration on the vehicle 100 can include, for example, an axial arrangement of the cylindrical rotor 206 and the cylindrical stator 208 on the front axles, a radial arrangement of the cylindrical rotor 306 and the cylindrical stator 308 on the rear axles, etc.

Figure 5:
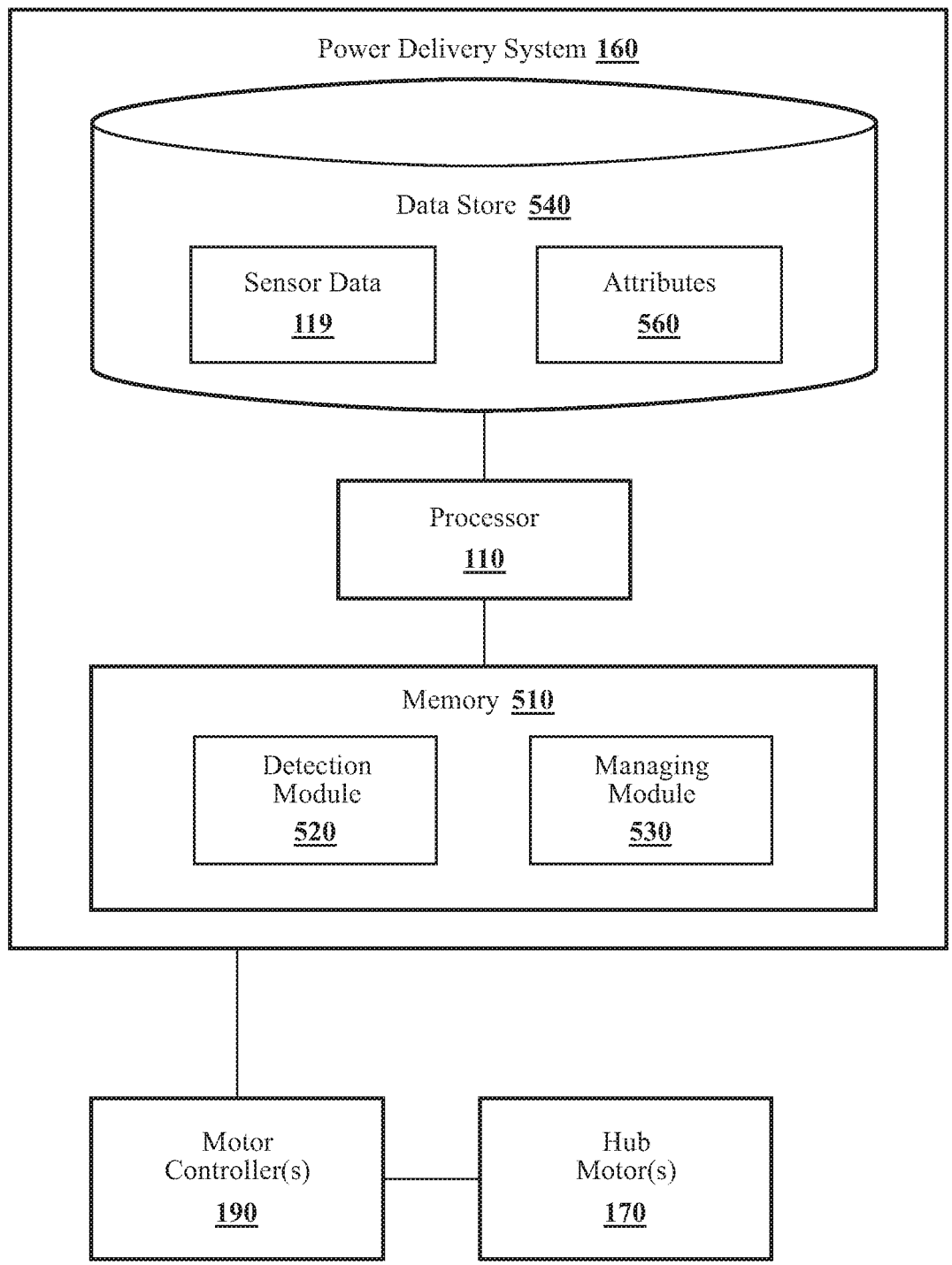
FIG. 5 illustrates one embodiment of a power delivery system that is associated with improving propulsion of a vehicle.

With reference to FIG. 5, one embodiment of the power delivery system 160 of FIG. 1 is further illustrated. The power delivery system 160 is shown as including a processor 110 from the vehicle 100 of FIG. 1. Accordingly, the processor 110 may be a part of the power delivery system 160, the power delivery system 160 may include a separate processor from the processor(s) 110 of the vehicle 100, or the power delivery system 160 may access the processor 110 through a data bus or another communication path. In one embodiment, the power delivery system 160 includes a memory 510 that stores a detection module 520 and a managing module 530. The memory 510 is a random-access memory (RAM), read-only memory (ROM), a hard-disk drive, a flash memory, or other suitable memory for storing the modules 520 and 530. The modules 520 and 530 are, for example, computer-readable instructions that when executed by the processor 110 cause the processor 110 to perform the various functions disclosed herein.

With continued reference to FIG. 5, in one embodiment, the power delivery system 160 includes a data store 540. The data store 540 is, in one embodiment, an electronic data structure (e.g., a database) for storing information. For example, in one approach, the data store 540 is a database that is stored in the memory 510 or another suitable medium, and that is configured with routines that can be executed by the processor 110 for analyzing stored data, providing stored data, organizing stored data, and so on. In either case, in one embodiment, the data store 540 stores data used by the modules 520 and 530 in executing various functions. In one embodiment, the data store 540 includes sensor data 119 and attributes 560 of the hub motor 170 along with, for example, other information that is used by the modules 520 and 530.

Accordingly, in one embodiment, the detection module 520 generally includes instructions that function to control the processor 110 to detect a change in a wheel configuration. The change in the wheel configuration is associated with a modification of an arrangement of the hub motors 170 that are attached and/or detached to/from the wheels 204 of the vehicle 100. In one arrangement, the detection module 520 receives one or more motor signals from known wheel locations on the vehicle 100. The motor signals include, in one aspect, unique identifiers of the hub motors 170 associated with the known wheel locations. Specifically, in one or more configurations, the cylindrical rotor 206 and the cylindrical stator 208 include unique identifiers that distinguish them from each other. For example, the unique identifier may be digital data stored in a memory of the cylindrical rotor 206 and cylindrical stator 208.

The detection module 520, in one embodiment, receives the motor signals from the motor controllers 190 and/or the cylindrical rotors 206 and cylindrical stators 208, e.g., at a defined frequency, upon vehicle start-up, when the cylindrical stator 208 receives power, etc. As set forth below, the motor signals are associated with the known wheel locations. The detection module 520 may compare the unique identifier received in the past with the current unique identifier to determine, i.e., detect, an occurrence of a change in the wheel configuration. By way of example, the detection module 520 uses the unique identifiers to discern whether a cylindrical stator 208 is detached, serviced, and re-attached to the same wheel location on the vehicle 100. In this case, the detection module 520 receives the same unique identifier from the same location, which would not be considered a change in the wheel configuration.

Additionally, in one arrangement, the detection module 520 identifies the change in the wheel configuration in response to detecting the change from the motor signals. The detection module 520 gathers the unique identifiers and identifies the number of hub motors 170 on the wheels 204 of the vehicle 100. In other words, the detection module 520 identifies which hub motor 170 is attached, and which hub motor 170 was detached. Moreover, since the motor signals are associated with known wheel locations, the detection module 520 identifies where the hub motors 170 are attached/detached, as well as swap conditions, i.e., when the same hub motor moved from one location to another location.

In one embodiment, the detection module 520 may receive the motor signals from the motor controllers 190 via a wired or a wireless connection to identify the hub motor locations. For example, the detection module 520 may include electrical ports configured to receive the motor signals, via the wired or wireless connection, directly from the motor controllers 190 located near specific wheel locations, e.g., front-right wheel, front-left wheel, rear-right wheel, rear-left wheel, etc. In some instances, the power delivery system 160 may assign the specific wheel location to the electrical ports of the detection module 520. Alternatively, the detection module 520 may receive the motor signals directly from the hub motors 170. For example, the detection module 520 receives the motor signals from the cylindrical stator 208 and/or the cylindrical rotor 206 via the wired or wireless connection in a similar manner.

Furthermore, the detection module, in one embodiment, identifies the attributes 560 of the hub motors 170 coupled with, i.e., attached to, the wheels 204 of the vehicle 100 in response to detecting the change in the wheel configuration. In one arrangement, the unique identifier includes the attributes 560 of the hub motor 170, and the detection module 520 parses the unique identifier to retrieve the attributes 560. The attributes 560 indicate characteristics of the hub motor 170, the cylindrical rotor 206, the cylindrical stator 208, and the mounting configuration of the cylindrical stator 208, as described further below. For example, the attributes 560 may include an identification number (e.g., a serial number, unique code, etc.) that distinctively identifies the cylindrical rotor 206 and the cylindrical stator 208. The detection module 520, in one arrangement, stores the attributes 560 in the data store 540 or the memory 510 for further use by the managing module 530.

Accordingly, in one embodiment, the managing module 530 generally includes instructions that function to control the processor 110 to determine properties of the hub motors 170 according to the attributes 560 and the wheel configuration. For example, the managing module 530 calculates at least a power rating that defines maximum input power delivered to the hub motors 170 according to the attributes 560 and relative locations of the hub motors 170 on the vehicle 100.

Depending on the wheel configuration, the properties of one or more hub motors 170 may need to be derated. By way of example, the detection module 520 detects a change in the wheel configuration from a FWD configuration to an AWD configuration and stores the associated attributes 560 of the four hub motors 170. For this example, the managing module 530 determines that one of the hub motors 170 located at the front-right wheel location has a different mechanical property that corresponds to a lower full-load torque ability than the other three hub motors 170. In this case, the managing module 530 may derate the hub motor 170 located at the front-left wheel location so that the associated full-load torque output does not interfere with the hub motor 170 located at the front-right wheel location, e.g., to prevent applying excessive torque to the hub motor 170 on the front-right wheel.

Furthermore, the managing module 530, in one or more embodiments, manages the electrical power delivery to the hub motor 170 to propel the vehicle 100 according to the properties. That is, the managing module 530 utilizes the detected wheel configuration that includes the locations of the hub motors 170 on the vehicle 100 and the associated properties identified from the attributes 560 to deliver the appropriate electrical power to the hub motors 170. In one arrangement, the managing module 530 independently manages the electrical power to provide distinct levels of the electrical power to separate ones of the hub motors 170. In other words, the managing module 530 may independently manage the electrical power delivery to each of the hub motors 170.

Figure 6:
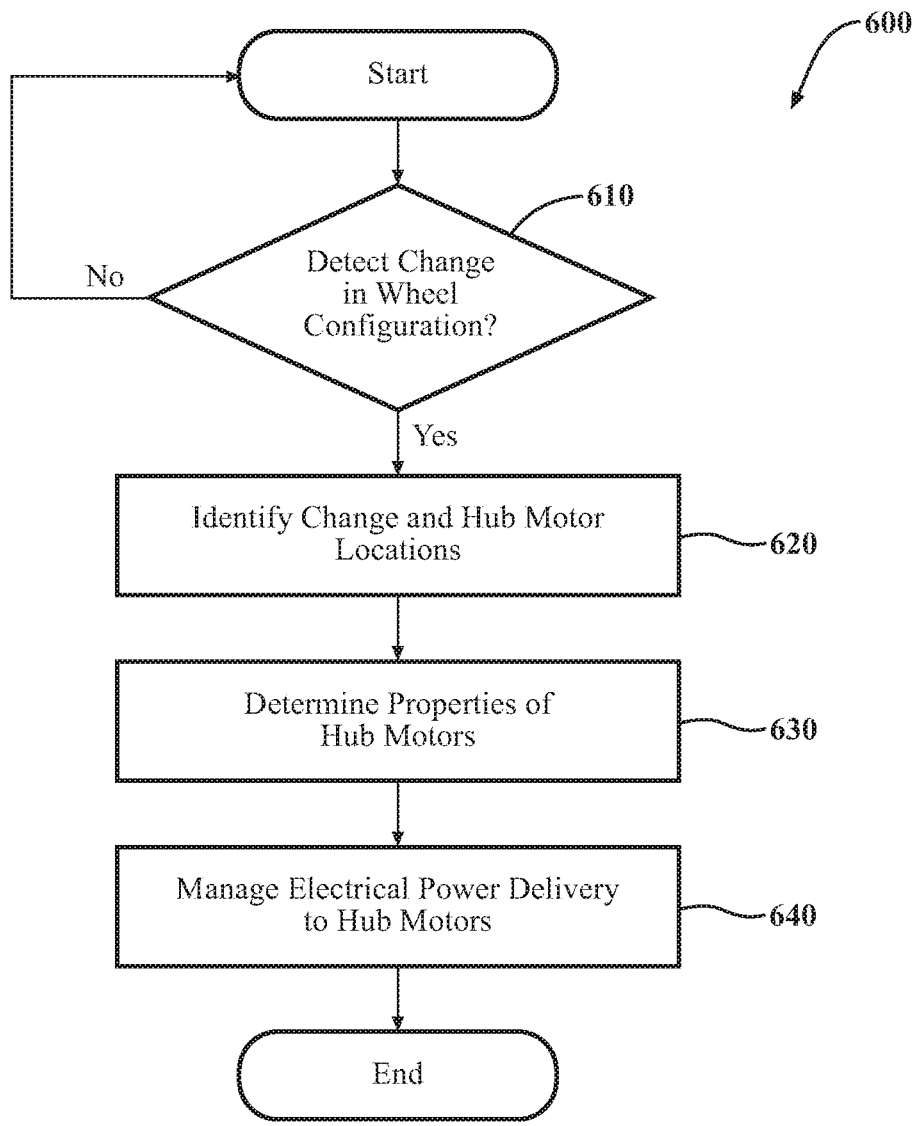
FIG. 6 illustrates one embodiment of a method that is associated with improving propulsion of a vehicle.
Figure 7:
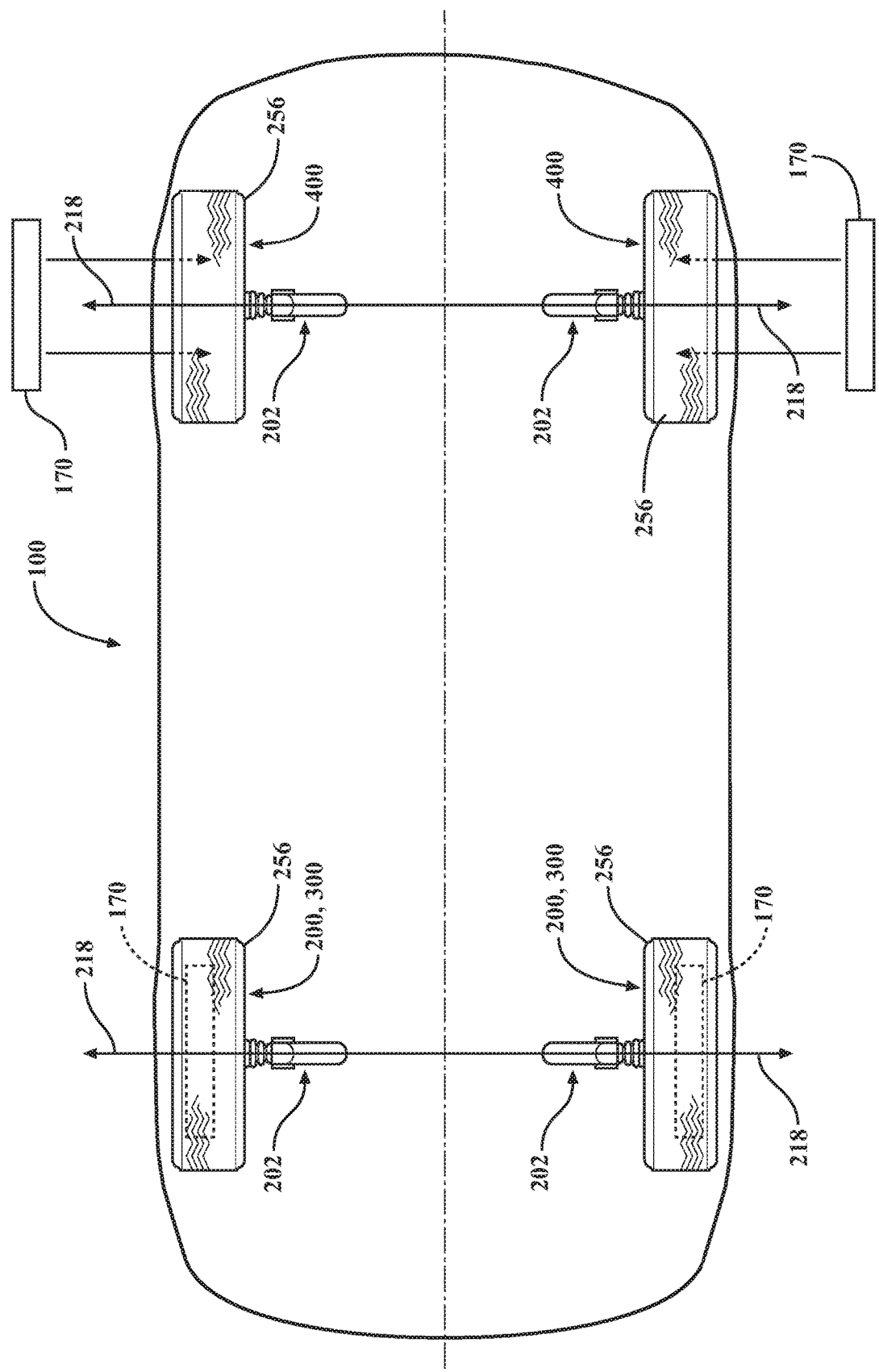
FIG. 7 is a schematic bottom view of an embodiment of a vehicle configured for RWD where two additional hub motors are attached to front axles to convert the RWD vehicle to an AWD vehicle.
Figure 8:
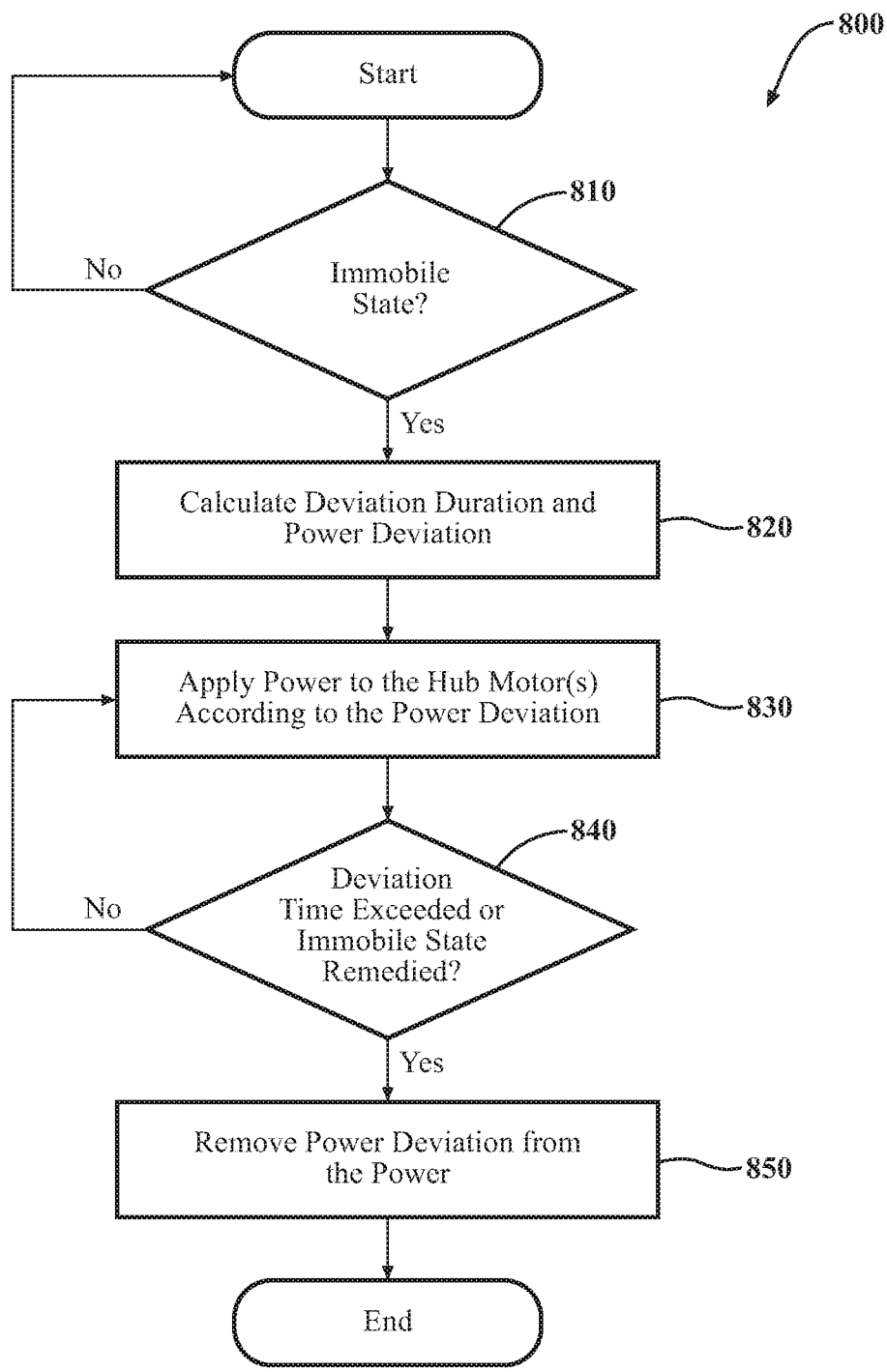
FIG. 8 illustrates one embodiment of a method that is associated with managing electrical power delivery to hub motors during an immobile state of a vehicle.
Figure 9:
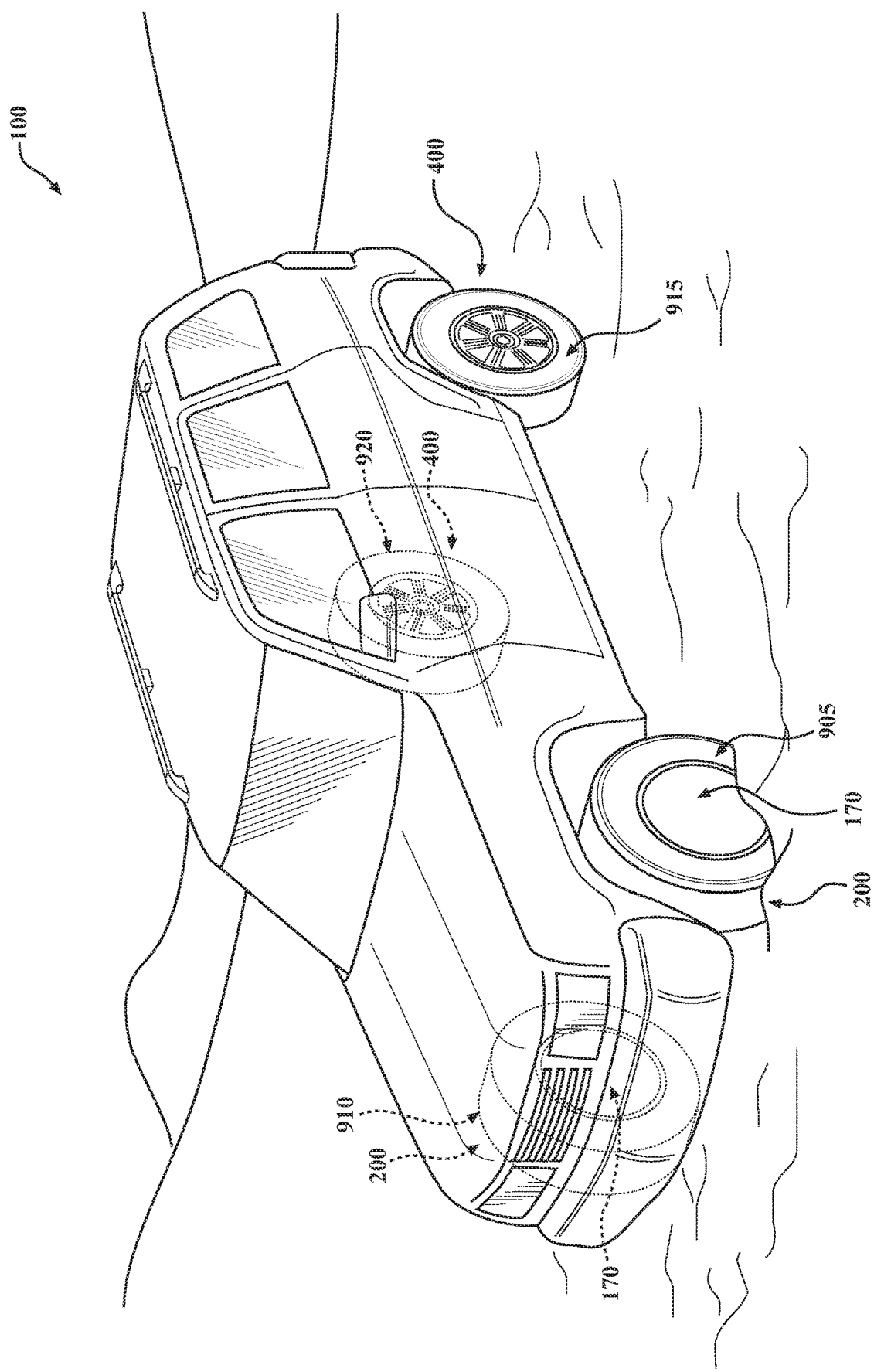
FIG. 9 illustrates one example of a vehicle in an immobile state.

Additional aspects of managing electrical power delivery to the hub motors 170 will be discussed in relation to FIGS. 6-9. FIG. 6 illustrates a flowchart of a method 600 that is associated with improving propulsion of the vehicle 100 by converting, for example, the vehicle configuration from a RWD to an AWD, as shown in FIG. 7. FIG. 8 illustrates a flowchart of a method 800 that is associated with managing the electrical power delivery to the hub motors 170 during an immobile state of the vehicle 100, as shown in FIG. 9. Methods 600 and 800 will be discussed from the perspective of the power delivery system 160 of FIGS. 1-5. While methods 600 and 800 are discussed in combination with the power delivery system 160, it should be appreciated that the methods 600 and 800 are not limited to being implemented within the power delivery system 160, but is instead are examples of systems that may implement the methods 600 and 800.

The method 600 and FIG. 7 demonstrate the flexibility of the power delivery system 160 in improving propulsion of the vehicle 100 by allowing the vehicle user to convert the vehicle configuration from RWD to AWD for an intended purpose. For example, the vehicle user may want to convert the vehicle 100 to AWD to enhance vehicle performance in an off-road environment, as illustrated in FIG. 7. The outward-facing location of the hub motor sub-components (e.g., the cylindrical rotor 206 and cylindrical stator 208) allows the vehicle user to attach hub motors 170 to the front-left and the front-right wheel locations, as shown in FIG. 7. It should be appreciated that other vehicle configurations are possible depending upon the specific needs of the vehicle user. For example, the vehicle user may detach the hub motors 170 from the rear axles when the off-roading activities are complete, thus converting the vehicle configuration to FWD in anticipation of snow during upcoming commuter traveling.

As another example, the vehicle user may upgrade the hub motors 170 on the front axles from a radial flux type to an axial flux type to provide more low-speed torque for towing during vacation. Other vehicle configurations are possible, such as adding more powerful hub motors 170 when the vehicle 100 is immobile, attaching/detaching hub motors 170 to multi-axle vehicles, etc. The reconfiguration scenarios mentioned may also provide sales, service, or other monetization opportunities, e.g., selling a base FWD electric vehicle with the possibility of later upgrades, selling, leasing or renting additional hub motors, service opportunities, etc. In this way, the configuration of the mounting components of the wheels permits different hub motors to be selectively attached thereby improving configurability of the vehicle 100 and expanding the usage scenarios for the vehicle 100.

Accordingly, at 610, the detection module 520 monitors for a change in a wheel configuration. For example, the detection module 520 receives one or more motor signals from either the motor controllers 190 associated with specific hub motors 170 and/or directly from the hub motors 170. The motor signals may be broadcast, e.g., at a defined frequency, upon vehicle start-up, when the cylindrical stator 208 receives power, etc. The detection module 520, in one arrangement, retrieves the attributes 560, (e.g., identification numbers) by parsing the unique identifiers of the motor signals, which distinctly identifies the cylindrical rotors 206 and the cylindrical stators 208. In one embodiment, the detection module 520 compares the identification numbers obtained from a past broadcast to a current broadcast to determine a difference in a configuration of the cylindrical rotors 206 and the cylindrical stators 208 currently attached to the wheels 204 of the vehicle 100. A change in the wheel configuration may be detected when the detection module 520 determines that the identification numbers are different between broadcasts. As indicated previously and further discussed below, the detection module 520 knows the wheel location where the motor signals originated from and may verify that the same hub motor component was not detached and re-attached to the same location.

At 620, the detection module, in one arrangement identifies the change in the wheel configuration associated with the detected modification to the arrangement of hub motors 170. For example, the detection module 520 collects the identification numbers from the parsed unique identifiers associated with known wheel locations and identifies which hub motors 170 were attached, detached, and swapped.

Furthermore, the detection module, in one embodiment, identifies the locations of the hub motors 170 from the motor signals. As indicated previously, the detection module 520 may receive wired or the wireless motor signals directly from the motor controllers 190 and/or the cylindrical rotor 206 and the cylindrical stator 208 located near specific wheel locations, e.g., front-right wheel, front-left wheel, rear-right wheel, rear-left wheel, etc. For example, a wired and/or wireless configuration of the vehicle 100 (e.g., wire harness layout, antenna configurations, etc.) may allow the detection module 520 to determine specific wheel locations that correspond to the motor signals from, e.g., a configured electrical port of the detection module 520. The motor controllers 190 and/or the detection module 520 may be configured, i.e., calibrated, to receive the unique identifiers from the cylindrical rotor 206 and the cylindrical stator 208 located at specific wheel locations from, e.g., wired connections, radio frequency identification (RFID) protocol communications, etc.

At 630, the managing module 530 determines the properties of the hub motors 170 associated with the detected modification to the arrangement of hub motors 170. The detection module, in one arrangement, parses the unique identifiers to retrieve the attributes 560 of the hub motors 170 that are used to determine the properties of the hub motors 170. The managing module 530, in one arrangement, calculates at least the power rating of the hub motor 170 that defines the maximum input power deliverable to the hub motor 170 from the motor controller 190. For example, the maximum input power is a continuous power deliverable to the hub motor 170 without the hub motor 170 overheating. The power rating may depend at least upon such attributes 560 as a rated voltage, a rated current, a motor efficiency, full-load speed, an insulation rating, i.e., a temperature rating of stator windings, rotor and stator properties, and a heat sink configuration. The rated voltage is a voltage at which the hub motor 170 is designed to operate. The rated current is a continuous current at the rated voltage that is deliverable to the hub motor 170 without overheating the stator windings. The motor efficiency is a ratio of the output power to the input power of the hub motor 170 and may account for motor losses. The full-load speed is the speed at which the rated full-load torque is delivered. It should be noted that the rated current, in most cases, is specified at a maximum ambient temperature, e.g., 40C, which implies that the power rating is dependent upon the ambient temperature. Also, the managing module 530 may receive the ambient temperature from one or more environment sensors 122 of a sensor system 120 (FIG. 1).

In one embodiment, the hub motor 170 includes at least one temperature sensor that monitors a temperature of the stator windings. For example, the temperature sensor wiring may be included in electrical interface 258 of the hub motor 170, as set forth above. The stator windings are typically the highest temperature sub-components of the hub motor 170. The insulation rating determines the absolute maximum temperature of the windings, beyond which damage may occur. The power rating affects the temperature of the stator windings, e.g., a higher power rating equates to more power injected into the hub motor 170, which raises the temperature of the stator windings. Therefore, the managing module 530, in one embodiment, adjusts the power rating as a function of the ambient temperature around the hub motor 170. For example, when the ambient temperature exceeds 40 C, the managing module 530 may reduce the power rating accordingly so as not to exceed the insulation rating.

The managing module 530, in one embodiment, determines a width of the air gap 232, 332 from the attributes 560, e.g., from the rotor and stator properties. Alternatively, or in addition to, the managing module 530 may utilize a lookup table stored in the data store 540 or the memory 510 to determine the width of the air gap 232, 332 by cross-referencing the identification numbers of the cylindrical rotor 206 and the cylindrical stator 208. The managing module 530, in one embodiment, outputs the width of the air gap 232, 332 to the vehicle user via an output system 135 of the vehicle 100 via, e.g., a navigation display, an instrumentation display, etc. The vehicle user may verify the width by, for example, using a standard spark plug gap measuring tool. The vehicle user may adjust the width of the air gap 232 and/or the alignment of the cylindrical rotor 206, 306 and the cylindrical stator 208, 308 by modifying a position of the rotor stop 234, the predetermined rotor position ($P_R$), and/or the predetermined stator position ($P_S$).

In one embodiment, the stator spacer 236 is a sub-component of the cylindrical stator 208. In this case, the stator spacer 236 may be rigidly attached to the cylindrical stator 208, and the unique identifier of the cylindrical stator 208 may store the corresponding heat sink configuration, i.e., thermal properties of the cylindrical stator 208 and the stator spacer 236. Thermal properties of a wheel junction defined from the stator spacer 236 to the ambient air may be known and stored in the data store 540 or the memory 510. Alternatively, the managing module 530 may prompt the vehicle user for the type of wheel via an input system 130 of the vehicle 100, e.g., a touch screen. For example, the vehicle user, in response to the prompt, may enter a serial number of the wheel 204, the wheel radius, the wheel hub material, etc., and the managing module 530 may calculate the thermal properties of the wheel junction. In either case, the managing module 530 may determine a thermal time constant of a heat sink of the wheel system that includes the thermal properties of the cylindrical stator 208, the stator spacer 236, and the wheel junction. As discussed below, the thermal time constant may be used to determine characteristics of a temperature rise of the stator windings given a step input of electrical power to the hub motor 170.

Additionally, the managing module 530 may derate the properties of one or more hub motors 170 depending on the wheel configuration, as previously indicated. The managing module 530, in one arrangement, may determine mechanical properties of the hub motors 170. For example, the managing module 530 may calculate the rated full-load torque of all the attached hub motors 170 from the attributes 560. The managing module 530 may determine that a torque property (e.g., the full-load torque) of the hub motors 170 on the front axles, the rear axles, and/or the supplemental axles are mismatched. In this case, the managing module 530 may derate the one or more of the hub motors 170 to balance the torque delivery capabilities of the hub motors 170 on the respective axles. For example, the managing module 530 may derate the hub motors 170 by reducing the electrical power delivered to the appropriate hub motors 170 in order to stabilize the torque delivered to the respective axles.

At 640, the managing module 530 manages the electrical power delivery to the hub motor 170 according to the properties. Because of the electrical power delivery capability at each wheel 204 of the vehicle 100, the managing module 530, in one embodiment, independently manages the electrical power delivery to each of the hub motors 170. The managing module 530 may derate the properties of the hub motors 170. For example, the managing module 530 may calculate a derating factor to apply to the power rating to lower the temperature of the stator windings, which may correspond to lowering an effective input current to the hub motors 170. In other cases, the managing module 530 may increase the power rating to deliver more torque to the wheels 204 for a short time, as described in the method 800 below.

Furthermore, the managing module 530, in one embodiment, modifies the electrical power delivery to one or more of the hub motors 170 according to a vehicle configuration. For example, a capacity, i.e., a state of charge, of the vehicle battery 180 may not be sufficient to supply the electrical power to the hub motors 170 under certain conditions, e.g., an off-road maneuver in an AWD vehicle configuration. In this case, the managing module 530 may modify the electrical power delivery to the one or more of the hub motors 170 to lower the effective input current. Similarly, for example, a temperature threshold of the vehicle battery 180 may be exceeded, causing the managing module 530 to reduce the input power to the hub motors 170 in efforts to lower the temperature of the vehicle battery 180.

Additionally, the vehicle configuration may include wiring connected to the hub motors 170 having an electrical current rating, e.g., the electrical power bus 262. The current rating may be stored in the data store 540 or the memory 510. The managing module 530 may modify the electrical power delivery to the hub motors 170 according to the electrical current rating of the wiring. For example, the vehicle user may attach a set of hub motors 170 to the front axles, which are capable of producing high torque for towing. In this case, the managing module 530 may limit the input current to the set due to possibly exceeding the current rating of the wiring. Further, the vehicle configuration may include regenerative braking. The managing module 530, in one arrangement, may modify the electrical power delivery to one or more of the hub motors 170 according to the application of regenerative braking.

The method 800 is an example of how the power delivery system 160 improves propulsion of the vehicle 100 by managing the electrical power delivery to the hub motors 170 during an immobile state of the vehicle 100 to temporarily apply additional power to the hub motors 170. FIG. 9 illustrates the vehicle 100 in an immobile state where the front-left wheel 905 is stuck. The vehicle 100 in FIG. 9 includes a FWD configuration (i.e., the hub motors 170 are present on the front axles of the vehicle 100) and all four wheels 905, 910, 915, and 920 are in contact with a roadway. In the scenario of FIG. 9, the front-right wheel 910 is slipping, i.e., has no traction, and the front-left wheel 905 can not rotate regardless of whether the associated hub motor 170 receives the power rating.

At 810, the vehicle 100 determines an immobile state of the vehicle 100. For example, one or more vehicle systems 140 of the vehicle 100 (e.g., a traction control system, an anti-lock brake system, etc.) determine that at least one wheel is slipping while the vehicle 100 is not moving along the roadway. In this case, the vehicle systems 140 may transmit an immobile message onto a vehicle bus (e.g., a vehicle controller area network (CAN) bus) indicating that the vehicle 100 is in an immobile state. The detection module 520, in response to the immobile message, may notify the managing module 530. Alternatively, the detection module 520 may, for example, monitor the wheel speeds and the vehicle speed from the vehicle CAN to determine the immobile state and notify the managing module 530 accordingly.

At 820, the managing module 530 calculates a power deviation and a deviation duration. For example, the power deviation is a power level that exceeds the power rating, which effectively can apply more torque to the hub motor 170, and thus the wheel/tire, to possibly remedy the immobile state. The deviation duration is a time that the power deviation is applied. The power deviation and the deviation time are dependent on at least the ambient temperature and the temperature of the stator windings. For example, the managing module 530 may calculate the power rating that establishes a temperature margin below the absolute maximum temperature associated with the insulation rating of the stator windings, e.g., 30 C. The power deviation is a power level that exceeds the power rating by, e.g., 110%, 115%, 120%, 125%, 130%, etc., and may be applied to the hub motor 170 as a step increase to the power rating. Accordingly, the deviation duration depends on the thermal time constant of the heat sink associated with the wheel system 200, 300, as set forth above. Therefore, the managing module 530, in one embodiment, calculates the power deviation and the deviation duration according to at least the ambient temperature, the temperature of the stator windings, the thermal time constant, and the power level of the power deviation.

At 830, the managing module 530 applies the electrical power associated with the power deviation as an increase to the power rating. The managing module 530 applies the power deviation to the hub motor 170 of the front-left wheel 905 so that the corresponding additional torque may free the wheel 905. As a safeguard, the managing module 530 may monitor the temperature of the stator windings to confirm the thermal time constant.

At 840, the managing module 530 delivers the electrical power associated with the power deviation until either notified by the detection module 520 that the immobile state is remedied or that the deviation duration has expired. Alternatively, or in addition to, the managing module 530 may utilize the temperature of the stator windings as a method for determining when the removal of the electrical power increase corresponding to the power deviation should occur. It should be appreciated that the temperature of the stator winding from the temperature sensor may be an average stator winding temperature and that areas of the stator winding may be hotter. Therefore, a combination of the deviation duration and the stator temperature may prove to be a viable alternative to controlling the electrical power delivery that includes the power deviation.

At 850, the managing module 530 removes the electrical power increase associated with the power deviation from the hub motor 170. In other words, the managing module 530 reduces the electrical power delivery to the hub motor 170 to at most the power rating.

It should be noted that the managing module 530 may manage the electrical power delivery to more than one hub motor 170 according to the power deviation and the deviation duration when an immobile state is detected. As another example, the managing module 530 may remove electrical power from one or more of the hub motors 170 if the wheels

905-920, in an AWD vehicle configuration, are not in contact with the roadway during the immobile state, or any vehicle state, to conserve energy. Further, the managing module 530 may deliver electrical power according to the power deviation and the deviation duration, for example, when the vehicle user engages a mode switch (e.g., a sport mode) from within the vehicle 100. In other words, the detection module 520 of the method 800 would monitor both the mode switch and the immobile state. As yet another example, the vehicle user or an emergency responder may attach one or more hub motors 170 to the rear axles while the vehicle 100 is in the immobile state. In this scenario, the detection module 520 detects a change in the wheel configuration, which initiates the method 600 and may immediately remedy the immobile state. If the method 600 is not successful, the detection module 520 may detect an immobile state of the vehicle 100 once again, which initiates the method 800.

FIG. 1 will now be discussed in full detail as an example environment within which the system and methods disclosed herein may operate. The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 540) for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby.

The term "operatively connected," as used throughout this description, can include direct or indirect connections, including connections without direct physical contact. The term selectively attachable and detachable used in reference to a component indicates that a human user or operator may choose to attach or detach the component from the structure with which it is associated or related.

The one or more data store(s) 115 can include sensor data (e.g., sensor data 119). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of an external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100. Moreover, the vehicle sensor(s) 121 can include sensors throughout a passenger compartment such as pressure/weight sensors in seats, seatbelt sensors, camera(s), and so on.

Alternatively, or in addition to, the sensor system 120 can include the one or more environment sensors 122 configured to acquire, and/or sense driving environment data. "Driving environment data" includes data or information about the external environment in which the vehicle 100 is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc. The one or more environment sensors 122 can be configured to detect, and/or sense the ambient temperature around the external environment of the vehicle 100.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include the input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include the output system 135. An "output system" includes any device, component, or arrangement or groups thereof that enable information/data to be presented to a vehicle passenger (e.g., a person, a vehicle passenger, a vehicle user, etc.).

The vehicle 100 can include the one or more vehicle systems 140. In one example, the vehicle 100 can include a propulsion system, an anti-lock braking system, a traction system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The vehicle 100 can include one or more actuators 150. The actuators 150 can be any element or combination of elements operable to modify, adjust and/or alter the one or more of the vehicle systems 140 or components thereof responsive to receiving signals or other inputs from the processor(s) 110. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, the one or more data stores 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A power delivery system for improving propulsion of a vehicle, comprising:
   one or more processors;
   a memory communicably coupled to the one or more processors and storing:
   a detection module including instructions that when executed by the one or more processors cause the one or more processors to, in response to detecting a change in a wheel configuration associated with modifying an arrangement of hub motors that are selectively attachable on wheels of the vehicle, identify attributes of the hub motors coupled with the wheels of the vehicle, the hub motors structured to be attached to the wheels of the vehicle without removing the wheels from the vehicle; and
   a managing module including instructions that when executed by the one or more processors cause the one or more processors to determine properties of the hub motors according to the attributes and the wheel configuration, and manage electrical power delivery to the hub motors to propel the vehicle according to the properties.

2. The power delivery system of claim 1, wherein the detection module further includes instructions to, in response to receiving motor signals from known wheel locations, the motor signals having unique identifiers of the hub motors associated with the known wheel locations, identify the change in the wheel configuration and locations of the hub motors relative to the vehicle.

3. The power delivery system of claim 2, wherein the unique identifiers include the attributes of the hub motors, and
   wherein the detection module further includes instructions to:
      parse the unique identifiers to retrieve the attributes, the attributes indicating at least one of a rated voltage, a rated current, a motor efficiency, full-load speed, an insulation rating, rotor and stator properties, and a heat sink configuration, and
      store the attributes in a local memory of the vehicle.

4. The power delivery system of claim 1, wherein the managing module further includes instructions to calculate at least a power rating that defines maximum input power delivered to the hub motors according to the attributes and relative locations of the hub motors.

5. The power delivery system of claim 4, wherein the detection module further includes instructions to monitor the vehicle for an immobile state, and
   wherein, in response to detecting the immobile state, the managing module further includes instructions to:
      calculate a deviation duration and a power deviation that exceeds the power rating for effecting movement of the vehicle without causing damage to the hub motors, and
      apply power according to the power deviation to one or more of the hub motors for at most the deviation duration.

6. The power delivery system of claim 1, wherein the managing module further includes instructions to independently manage electrical power to provide distinct levels of the electrical power to separate ones of the hub motors.

7. The power delivery system of claim 1, wherein the managing module further includes instructions to modify the electrical power delivery according to a vehicle configuration, wherein the vehicle configuration is associated with a capacity of a vehicle battery, an electrical current rating of wiring connected to the hub motors, and regenerative braking capabilities of the vehicle.

8. A non-transitory computer-readable medium for improving propulsion of a vehicle and storing instructions that when executed by one or more processors cause the one or more processors to:
   in response to detecting a change in a wheel configuration associated with modifying an arrangement of hub motors that are selectively attachable on wheels of the vehicle, identify attributes of the hub motors coupled with the wheels of the vehicle, the hub motors structured to be attached to the wheels of the vehicle without removing the wheels from the vehicle;
   determine properties of the hub motors according to the attributes and the wheel configuration; and
   manage electrical power delivery to the hub motors to propel the vehicle according to the properties.

9. The non-transitory computer-readable medium of claim 8, wherein the instructions to detect the change in the wheel configuration include instructions to, in response to receiving motor signals from known wheel locations, the motor signals having unique identifiers of the hub motors associated with the known wheel locations, identify the change in the wheel configuration and locations of the hub motors relative to the vehicle.

10. The non-transitory computer-readable medium of claim 9, wherein the unique identifiers include the attributes of the hub motors, and
    wherein the instructions to identify the attributes of the hub motors further include instructions to:
       parse the unique identifiers to retrieve the attributes, the attributes indicating at least one of a rated voltage, a rated current, a motor efficiency, full-load speed, an insulation rating, rotor and stator properties, and a heat sink configuration, and
       store the attributes in a local memory of the vehicle.

11. The non-transitory computer-readable medium of claim 8, wherein the instructions to determine the properties of the hub motors further include instructions to calculate at least a power rating that defines maximum input power delivered to the hub motors according to the attributes and relative locations of the hub motors.

12. The non-transitory computer-readable medium of claim 11, further comprising instructions to monitor the vehicle for an immobile state, and
wherein, in response to detecting the immobile state, the instructions to manage the electrical power delivery to the hub motors include instructions to:
calculate a deviation duration and a power deviation that exceeds the power rating for effecting movement of the vehicle without causing damage to the hub motors, and
apply power according to the power deviation to one or more of the hub motors for at most the deviation duration.

13. A method of improving propulsion of a vehicle, comprising:
in response to detecting a change in a wheel configuration associated with modifying an arrangement of hub motors that are selectively attachable on wheels of the vehicle, identifying attributes of the hub motors coupled with the wheels of the vehicle, the hub motors structured to be attached to the wheels of the vehicle without removing the wheels from the vehicle;
determining properties of the hub motors according to the attributes and the wheel configuration; and
managing electrical power delivery to the hub motors to propel the vehicle according to the properties.

14. The method of claim 13, wherein detecting the change in the wheel configuration includes, in response to receiving motor signals from known wheel locations, the motor signals having unique identifiers of the hub motors associated with the known wheel locations, identifying the change in the wheel configuration and locations of the hub motors relative to the vehicle.

15. The method of claim 14, wherein the unique identifiers include the attributes of the hub motors, and
wherein identifying the attributes of the hub motors includes:
parsing the unique identifiers to retrieve the attributes, the attributes indicating at least one of a rated voltage, a rated current, a motor efficiency, full-load speed, an insulation rating, rotor and stator properties, and a heat sink configuration, and
storing the attributes in a local memory of the vehicle.

16. The method of claim 13, wherein determining the properties of the hub motors includes calculating at least a power rating that defines maximum input power delivered to the hub motors according to the attributes and relative locations of the hub motors.

17. The method of claim 16, further comprising:
monitoring the vehicle for an immobile state, and
wherein, in response to detecting the immobile state, managing the electrical power delivery to the hub motors includes:
calculating a deviation duration and a power deviation that exceeds the power rating for effecting movement of the vehicle without causing damage to the hub motors, and
applying power according to the power deviation to one or more of the hub motors for at most the deviation duration.

18. The method of claim 13, wherein modifying the arrangement of the hub motors on the wheels includes at least one of: attaching one or more of the hub motors to the wheels, and detaching one or more of the hub motors from the wheels.

19. The method of claim 13, wherein managing the electrical power delivery to the hub motors includes independently managing electrical power to provide distinct levels of the electrical power to separate ones of the hub motors.

20. The method of claim 13, wherein the managing the electrical power delivery to the hub motors includes modifying the electrical power delivery according to a vehicle configuration, wherein the vehicle configuration is associated with a capacity of a vehicle battery, an electrical current rating of wiring connected to the hub motors, and regenerative braking capabilities of the vehicle.

* * * * *